(12) United States Patent
Marechal et al.

(10) Patent No.: US 10,816,039 B2
(45) Date of Patent: Oct. 27, 2020

(54) DEVICE FOR DAMPING TORSIONAL OSCILLATIONS

(71) Applicant: VALEO EMBRAYAGES, Amiens (FR)

(72) Inventors: Olivier Marechal, Amiens (FR); Didier Bagard, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 270 days.

(21) Appl. No.: 15/745,480

(22) PCT Filed: Jul. 28, 2016

(86) PCT No.: PCT/EP2016/067983
§ 371 (c)(1),
(2) Date: Jan. 17, 2018

(87) PCT Pub. No.: WO2017/017174
PCT Pub. Date: Feb. 2, 2017

(65) Prior Publication Data
US 2018/0216696 A1    Aug. 2, 2018

(30) Foreign Application Priority Data

Jul. 30, 2015  (FR) ..................................... 15 57300

(51) Int. Cl.
*F16D 3/66* (2006.01)
*F16F 15/129* (2006.01)
(Continued)

(52) U.S. Cl.
CPC ............... *F16D 3/66* (2013.01); *F16D 7/025* (2013.01); *F16F 15/1297* (2013.01);
(Continued)

(58) Field of Classification Search
CPC .... F16D 3/66; F16D 7/025; F16D 2250/0076; F16D 2250/0069; F16D 2121/14;
(Continued)

(56) References Cited

U.S. PATENT DOCUMENTS 5,526,714 A   6/1996  Schierling
5,925,008 A   7/1999  Douglas
(Continued)

FOREIGN PATENT DOCUMENTS

EP   2 685 127 A1   1/2014
EP   2 765 330 A2   8/2014

OTHER PUBLICATIONS

International Search Report dated Oct. 28, 2016, in PCT/EP2016/067983 filed Jul. 28, 2016.

*Primary Examiner* — Greg Binda
(74) *Attorney, Agent, or Firm* — Oblon, McClelland, Maier & Neustadt, L.L.P.

(57) ABSTRACT

A device for damping torsional oscillations, including: a pendulum-type torsional oscillation damper, a supplementary torsional oscillation damper including an input element, an output element, wherein both are configured to rotate around one axis rotation, and at least one mechanical energy accumulator device disposed between the input and output elements, a torque limiter, including at least one friction coating fixed on a disk, configured to be displaced around the axis. The disk is connected to rotate with the input element of the supplementary torsional oscillation damper and the friction coating is fixed to the disk of the torque limiter by an adhesively bonded surface-to-surface joint.

15 Claims, 2 Drawing Sheets

(51) Int. Cl.
 *F16F 15/14* (2006.01)
 *F16D 7/02* (2006.01)
 F16D 121/14 (2012.01)
 F16F 15/31 (2006.01)

(52) U.S. Cl.
 CPC ........ *F16F 15/145* (2013.01); *F16D 2121/14* (2013.01); *F16D 2250/0069* (2013.01); *F16D 2250/0076* (2013.01); *F16F 15/31* (2013.01); *F16F 2226/042* (2013.01); *F16F 2226/048* (2013.01)

(58) Field of Classification Search
 CPC ...... F16F 15/145; F16F 15/1297; F16F 15/31; F16F 2226/048; F16F 2226/042
 USPC .......................................... 464/68.2; 192/201
 See application file for complete search history.

(56) References Cited

U.S. PATENT DOCUMENTS

| | | |
|---|---|---|
| 9,574,615 B2* | 2/2017 | Rusch .................. F16F 15/145 |
| 2013/0116054 A1 | 5/2013 | Amano et al. |
| 2014/0221106 A1 | 8/2014 | Jimbo et al. |

* cited by examiner

DEVICE FOR DAMPING TORSIONAL OSCILLATIONS

BACKGROUND OF THE INVENTION

The present invention relates to a device for damping torsional oscillations, especially one suitable for integration into a motor vehicle transmission train.

Such a device may be equipped with a torque limiter. It is known in particular to rivet friction coatings of this torque limiter onto a disk. In such cases, each coating has an overdimensioned thickness. In fact, it is necessary to provide sufficient thickness between the rivets and the friction surface of the coatings to, ensure that the rivet heads do not rub and degrade the device for damping torsional oscillations when the coatings become worn.

It is also necessary to provide sufficient thickness between the rivets and the disk to ensure that these rivets have retaining ability.

It is necessary to provide a minimum of material around the holes associated with the rivets in order to preserve the integrity of the coating. Finally, these holes, which are open-ended reduce the friction surface area.

From US Patent 2013116054, a device for damping torsional oscillations is also known that comprises in particular a torque limiter, a pendulum-type torsional oscillation damper and a supplementary torsional oscillation damper, wherein both are capable of rotating around one and the same axis. The supplementary torsional oscillation damper comprises in particular an input element, an output element and springs between these input and output elements to oppose relative pivoting of these two elements.

SUMMARY OF THE INVENTION

In such a device, the pendulum-type torsional oscillation damper is positioned radially above the torque limiter. Such a device therefore does not have compactness, and in particular does not have satisfactory radial compactness.

The invention aims to improve this type of device.

Thus the object of the invention is in particular a device for damping torsional oscillations, especially for a motor vehicle transmission train, equipped with:
- a pendulum-type torsional oscillation damper,
- a supplementary torsional oscillation damper, comprising an input element, an output element, wherein both are capable of rotating around one axis of rotation, and at least one mechanical energy accumulator device disposed between the input and output elements, and
- a torque limiter, comprising at least one friction coating fixed on a disk connected to rotate with the input element of the supplementary torsional oscillation damper, characterized in that the coating is fixed to the disk of the limiter by a surface-to-surface joint, especially by an adhesively bonded surface-to-surface joint.

The combined, action of the two dampers makes it possible to achieve satisfactory damping of torsional oscillations by the device.

By virtue of this surface-to-surface joint, the torque limiter does not require an intermediate solid piece, which would be a source of axial bulkiness.

The invention makes it possible in particular to limit the axial bulkiness of the limiter in the region of the coating. In fact, compared with a device in which the coating would be riveted onto the disk of the limiter, the thickness of the coating of the device according to the invention is reduced by the thickness of the rivet head and by a thickness related to the counterbore in the coating.

According to the invention, it is possible to minimize the radial thickness of the friction coating by providing an identical friction surface area, wherein the holes associated with rivets are nonexistent.

The reduced axial dimension of the torque limiter in the region of the friction coating makes it possible to provide an additional space to accommodate other elements of the device, in particular the pendulum-type damper.

This additional space facing the limiter makes it possible to obtain a compact module that is not very bulky and that performs several functions.

The disk of the limiter may be flat, wherein the two faces of this disk may be parallel to one another and perpendicular to the axis of rotation.

The surface-to-surface joint may extend in a plane, preferably a plane perpendicular to the axis of rotation.

The surface-to-surface joint may be established between the total surface of one face of the coating and the disk of the limiter. This joint may be established in a single manufacturing step, thus advantageously making it possible to reduce the manufacturing costs of the device Alternatively, the surface-to-surface joint may be established only between part of one face of the coating and the disk of the limiter.

Preferably, the coating is overmolded onto the disk of the limiter to form the adhesively bonded surface-to-surface joint.

Alternatively, the coating may be glued or welded onto the disk of the limiter to form the adhesively bonded surface-to-surface joint.

The absence of rivets makes it possible to provide a coating having an axial thickness that may be less than 1 mm, preferably less than 0.5 mm.

For the limiter, such a coating thickness is sufficient, although the configurations of the device in which the coating may be subject to wear is an exception.

The coating may be provided with a continuously wound wire impregnated with a bonding matrix. Alternatively, the coating, may be provided with fibers added to a bonding matrix.

The coating may have the shape of an annular disk with axis of rotation. Such a coating is perforated around the axis of rotation. Alternatively, the coating may have the shape of a disk portion, in which case the limiter may comprise a plurality of coatings spaced apart from one another, especially circumferentially, and disposed regularly around the axis of rotation.

Preferably, the limiter has at least two coatings disposed on both sides of the disk of the limiter, especially only one coating on each, side when these have the shape of an annular disk, or especially a plurality of coatings when these have the shape of annular disk portions. From one side to the other of the disk of the limiter, the coatings may be disposed face-to-face in pairs or they may be disposed in staggered arrangement.

The axial thickness of the assembly formed by the coating or coatings and the disk of the limiter may be less than 3 mm, preferably less than 2 mm, more preferably less than 1.5 mm.

This small thickness, especially compared with the thickness of riveted coatings, makes it possible to provide a satisfactory available space facing these coatings in order to accommodate other elements of the device, especially the pendulum-type damper.

This makes it advantageously to obtain a device for damping torsional oscillations that is more compact than those of the prior art.

The device may comprise an output hub capable of rotating around the axis of rotation. This output hub may be integral with each of the torsional oscillation dampers, in such a way that the pendulum-type damper and the supplementary damper are connected to rotate with one another. Thus the pendulum-type damper is able to drive the supplementary damper in rotation and vice versa.

This output hub may be able to transmit a torque, for example to a driven shaft.

The supplementary damper may be centered on the output hub. The supplementary damper may be integral on the output hub, especially via its output element. The output element of the supplementary damper is force-fitted, for example, on the output hub. Alternatively, the output hub may be meshed with the output element of the supplementary damper.

Preferably, a plurality of mechanical energy accumulator devices is disposed between the input and output elements of the supplementary damper.

The mechanical energy accumulator devices act to oppose pivoting of the output element relative to the input element.

The mechanical energy accumulator devices may be springs, especially curved springs.

The supplementary damper may be provided with an auxiliary annular skirt and two guide washers, mounted on both sides of the auxiliary skirt. The guide washers are able to maintain the mechanical energy accumulator devices axially.

The input element of the supplementary damper may be formed by the guide washers, wherein the output element is then formed by the auxiliary skirt.

Alternatively, the input element of the supplementary damper may be formed the auxiliary skirt, wherein the output element is then formed by the guide washers.

In both cases, windows are made in the auxiliary skirt and in the guide washers in order to receive the mechanical energy accumulator devices.

The pendulum-type damper may also be centered on the output hub. The pendulum-type damper may be equipped with a pendulum support capable of rotating around the axis of rotation. The pendulum-type damper may be centered on the output hub via its output element.

The pendulum support may be connected to rotate with the output hub, for example by force-fit, for example by meshing. The pendulum support may not extend radially beyond the coating.

The pendulum-type damper may be equipped with at least one pendulum mass, preferably a plurality of pendulum masses, capable of being displaced freely relative to the pendulum support and of being guided by this same pendulum support.

The pendulum mass may be mounted on the periphery, especially the external periphery, of the pendulum support. The pendulum mass is caused to execute a pendulum-type movement during operation and, for example, it may have two parts mounted axially on both sides of the pendulum support and connected to one another by one or more crosspieces, each passing through an opening of the pendulum support. A roller may cooperate with a rolling track made in each crosspiece and with the rim of the corresponding opening of the pendulum support.

Alternatively, the roller may cooperate with two rolling tracks, each made in an opening of one part of the pendulum mass, and with a third rolling track formed by the rim of an opening of the pendulum support different from the openings of the pendulum support dedicated to the crosspieces.

In each of these cases, several rollers may be provided for each pendulum mass.

In each of the cases, the axial thickness of the pendulum-type damper in the region of the pendulum mass may range between 9 and 15 mm.

In reacting to torsional oscillations or acyclical rotational irregularities, each pendulum mass is able to be displaced in such a way that its center of gravity oscillates in the manner of a pendulum.

Preferably, the pendulum mass and the coating are offset axially.

When the device for damping torsional oscillations is viewed along the axis of rotation, the pendulum mass is able to describe a zone of movement that may be superposed at least partly on the zone of movement described by the coating. The zones of movement of the coating and of the pendulum mass overlap axially at least partly.

Thus, in certain configurations of the device, an axis exists that is parallel to the axis of rotation and passes through both the pendulum mass and the friction coating. In such cases, the coating and the pendulum mass may therefore be disposed axially facing one another.

The assembly formed by the coating or coatings and the disk of the limiter and the pendulum mass or masses may extend along a coinciding diameter.

When several coatings and/or several pendulum masses are provided, the zones of movement of each coating may coincide and the zones of movement of each pendulum mass may coincide.

When measured along an axis parallel to the axis of rotation and passing through the pendulum mass and the coating, the axial thickness of the pendulum-type damper on the one hand and the axial thickness of the assembly formed by the coating or coatings and the disk of the limiter on the other hand may satisfy a ratio of between 3 and 8, preferably of between 5 and 7.5. The pendulum-type damper is therefore thicker than the assembly formed by the coating or coatings and the disk of the limiter on which they are fixed.

Since the axial thickness of the pendulum-type damper, when measured along the axis of rotation, is maximum in the region of the pendulum mass, the maximum thickness of the pendulum-type damper and the thickness of the assembly formed by the coating or coatings and the disk of the limiter may satisfy the same ratio as that just defined hereinabove.

The space available facing the coating makes it possible to accommodate one or more pendulum masses having satisfactory thickness. Since the filtration performances of the pendulum damper are related in particular to the weight of the pendulum masses, the device therefore makes it possible to filter the acyclical irregularities effectively.

The device may comprise a torque input element, especially an engine flywheel connected to rotate, especially by means of a plurality of rivets, with drive disks, especially two drive disks, which are concentric with the axis of rotation and belong to the torque limiter.

In the event that excessive torque is applied to the limiter, the coating or coatings is or are able to slide relative to the drive disks.

The two drive disks are spaced apart axially in such a way that they bracket the coating or coatings and the disk of the limiter. These two drive disks are able to approach one another, to the point of coming into contact, with increasing distance from the axis of rotation. In the region of this contact zone, it is possible to make the two drive disks integral with one another by means of a plurality of rivets.

These two drive disks may therefore be fixed radially outside of the coating or coatings.

The limiter may also be provided with a drive plate capable of rotating around the axis of rotation and of being displaced axially. The drive plate may be disposed between the two drive disks. The drive plate may be connected to rotate with the two drive disks.

The coating or coatings may be interposed between the drive plate and one of the drive disks.

When the limiter is provided with coatings disposed on both sides of the disk of the limiter, each may be braced on one face of the drive disk or on one face of the drive plate.

In the event that excessive torque is applied to the limiter, the coatings are designed to be able to slide, especially in rotation, relative to the drive disk and to the drive plate on which they are braced.

An elastic device, preferably a Belleville washer, may also be interposed between one of the two drive disks and the drive plate.

The elastic device may be braced on the face of the drive plate opposite the face of this plate on which a coating or the coatings is or are braced.

The elastic device makes it possible to maintain the drive plate braced against the coating or coatings, despite the wear of that coating or of those coatings. The elastic device may be prestressed in such a way that it continuously exerts a calibrated pressing force on the drive plate, making it possible to pinch the coating or coatings between this drive plate and the drive disk.

In addition to or independently of what has been described in the foregoing, the pendulum-type damper may be disposed downstream, in the sense of torque transmission, from the supplementary damper.

The supplementary damper may be disposed, in the sense of torque transmission, between the limiter and the pendulum-type damper. This makes it possible to avoid saturation of the pendulum-type damper, because the acyclical torque is attenuated by the supplementary damper and limited by the torque limiter. This therefore makes it possible for the pendulum-type damper to function better. The limiter also makes it possible to limit the torque originating from the internal combustion engine, in turn making it possible, for example, to reduce the dimension of the supplementary damper and/or to protect the supplementary damper and the pendulum-type damper.

The pendulum-type damper may be integral with the output hub. The pendulum-type damper may be fixed directly on the output hub.

The pendulum-type damper may be offset axially from the limiter. The pendulum-type damper may be offset axially from the supplementary damper.

The pendulum-type damper may be bracketed axially between the input element of the device and the supplementary damper.

The pendulum-type damper may be bracketed axially between the input element of the device, especially the primary flywheel, and the limiter.

The pendulum-type damper may be disposed outside the path taken by the torque.

The limiter may be centered on the engine flywheel.

The limiter may be positioned radially outside the supplementary damper.

The invention also has as an object a motor vehicle transmission train, equipped with a module such as described hereinabove.

BRIEF DESCRIPTION OF THE DRAWINGS

The invention will be better understood, and other details, characteristics and advantages of the invention will become apparent by reading the description hereinafter, given by way of non-limitative example with reference to the attached drawings, wherein.

DETAILED DESCRIPTION OF THE PREFERRED EMBODIMENT

Figure 1:
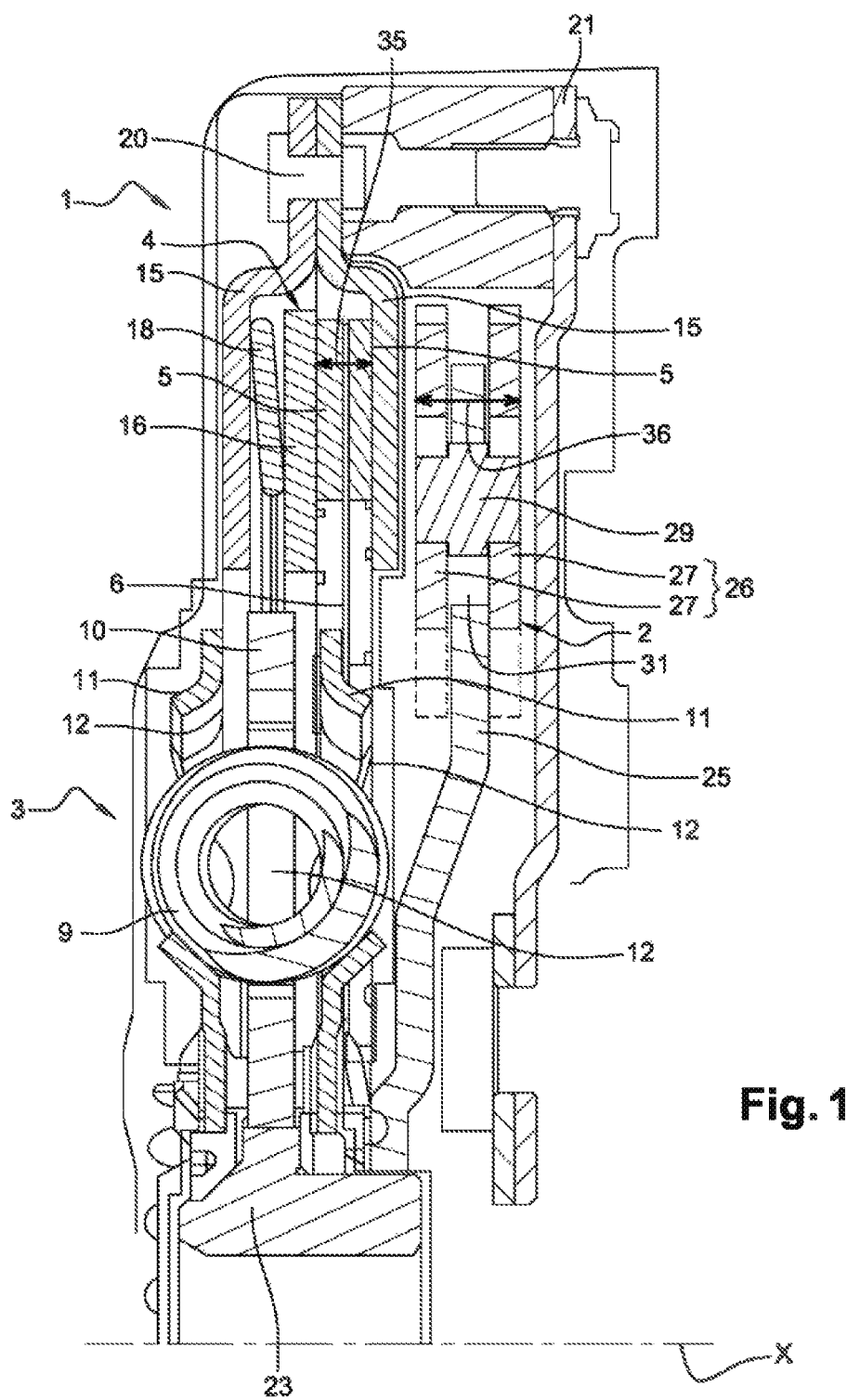
FIG. 1 is a schematic and partly sectional view of an example of the device according to the invention for damping torsional oscillations.

FIG. 1 represents a device 1 for damping torsional oscillations for a motor vehicle transmission train, equipped with:
  a pendulum-type torsional oscillation damper 2,
  a supplementary torsional oscillation damper 3, comprising an input element, an output element, wherein both are capable of rotating around one axis of rotation X, and a plurality of mechanical energy accumulator devices disposed between the input and output elements, and
  a torque limiter 4, comprising at least one friction coating 5 fixed on a disk 6 connected to rotate with the input element of supplementary torsional oscillation damper 3, In the example under consideration, the mechanical energy accumulator devices are curved springs 9, which act to oppose pivoting of the input element relative to the output element.

In the example under consideration, supplementary damper 3 comprises an auxiliary annular skirt 10 forming the output element of supplementary damper 3 and two guide washers 11 forming the input element of this damper. These two guide washers 11 are mounted on both sides of auxiliary skirt 10 and windows 12 are made in auxiliary skirt 10, and in guide washers 11 to receive springs 9. In addition, guide washers 11 maintain these springs 9 axially such that they cannot escape.

In the example under consideration, limiter 4 is positioned radially outside supplementary damper 3, and disk 6 of the limiter, which is flat, is fixed to one of the guide washers 11 by a plurality of fixation devices, for example rivets.

Two coatings 5 in the form of annular disks with axis X are disposed on both sides of disk 6 of the limiter (one coating on each side) and are fixed on this disk by an adhesively bonded surface-to-surface joint.

It will be noted in the example under consideration that coatings 5 in the form of disk portions may be disposed on both sides of disk 6 of the limiter, replacing the coatings in the form of annular disks.

These coatings 5 may be provided with a continuously wound wire impregnated with a bonding matrix and/or with fibers added to a bonding matrix.

In the example under consideration, the adhesively bonded surface-to-surface joint extends along a plane perpendicular to axis X, wherein coatings 5 and disk 6 of the limiter have facing planar surfaces that are perpendicular to axis X.

This adhesively bonded surface-to-surface joint is established between the total surface of one face of the coating and disk 6 of the limiter. In the example under consideration, the adhesively bonded surface-to-surface joint may also be established only between one part of the face of coating 5 and disk 6 of the limiter.

In the example under consideration, coatings 5 are overmolded onto disk 6 of the limiter to form the adhesively bonded surface-to-surface joint. It will be noted that coatings 5 may also be welded or glued.

In the example under consideration, coatings 5 each have an axial thickness of less than 1 mm, preferably of less than 0.5 mm, and the axial thickness of the assembly formed by coatings 5 and disk 6 of the limiter is less than 3 mm, preferably less than 2 mm, more preferably less than 1.5 mm.

Limiter 4 comprises two drive disks 15, which are concentric with axis X and integral with one another, and one drive plate 16, which is capable of rotating around axis X and of being displaced axially, and which is disposed between the two drive disks 15 and is connected to rotate with these two disks.

Coatings 5 are interposed between drive plate 16 and one of the drive disks 15, in such a way that they are continuously braced on one face of drive disk 15 and on one face of drive plate 16.

In the event that excessive torque is applied to limiter 4, coatings 5 are designed to be able to slide in rotation relative to drive disk 15 and to drive plate 16 on which they are braced.

In the example under consideration, an elastic device, in this case a Belleville washer 18, is interposed between the other of the two drive disks 15 and drive plate 16, and so Belleville washer 18 is braced on the face of drive plate 16 opposite the face of this plate on which coating 5 is braced. This Belleville washer 18 makes it possible to maintain drive plate 16 braced against coatings 15, despite wear of these coatings 5. Belleville washer 18 is prestressed in such a way that it continuously exerts a calibrated pressing force on drive plate 16, thus permitting pinching of coatings 5 between this drive plate 16 and drive disk 15.

In the example under consideration, the assembly formed by coatings 5 and disk 6 of the limiter on which they are overmolded is designed to be able to slide in rotation relative to drive disks 15 and to drive plate 16 in the event that excessive torque is applied to limiter 4.

The two drive disks 15 therefore bracket coatings 5 and disk 6 of the limiter and, with increasing distance from axis of rotation X, these two drive disks 15 approach one another, to the point of coming into contact. In the region of this contact zone, it is possible to make the two drive disks 15 integral with one another by means of a plurality of rivets 20.

The two drive disks 15 are therefore made integral radially outside coatings 5 and, in the same radial region, these two disks are connected to rotate with a torque-input element of device 1. In the example under consideration, the torque-input element is an engine flywheel 21 formed in several distinct parts.

In the example under consideration, engine flywheel 21 is designed to be fixed on a driving shaft, such as a crankshaft of an internal combustion engine.

In the example under consideration, the torque is transmitted from engine flywheel 21 to limiter 4 then to supplementary damper 3, the auxiliary skirt 10 of which forming the output element is integral with a force-fitted output hub 23 of the device.

This output hub 23, which is able to rotate around axis X, is capable of transmitting a torque, for example to a driven shaft, not represented here.

In the example under consideration, supplementary damper 3 is centered on output hub 23 via auxiliary skirt 10.

Furthermore, pendulum-type damper 2 may be equipped with a pendulum support 25 capable of rotating around axis of rotation X and with a plurality of pendulum masses 26.

Via pendulum support 25, this pendulum-type damper 2 is centered on and integral with output hub 23.

Pendulum support 25, which does not extend radially beyond coatings 5, is integral with and centered on output hub 23 by force-fit. Pendulum support 25 is formed in one piece and is rigid. Pendulum support 25 does not have any part having noteworthy elasticity.

Pendulum masses 26, mounted peripherally on pendulum support 25, are capable of being displaced freely relative to this support while being guided thereby.

Pendulum masses 26 are caused to execute a pendulum-type movement during operation, and they have two parts 27 mounted axially on both sides of pendulum support 25 and connected to one another by two crosspieces, each passing through an opening of pendulum support 25. A roller 29 cooperates with two rolling tracks, each made in an opening 30 of one part 27 of pendulum mass 26, and with a third rolling track formed by the rim of an opening 31 of pendulum support 25 different from the openings of the pendulum support dedicated to the crosspieces.

In reacting to torsional oscillations or acyclical rotational irregularities, each pendulum mass 26 is able to be displaced in such a way that its center of gravity oscillates in the manner of a pendulum.

In the example under consideration, axial thickness 36 of pendulum-type damper 2 in the region of pendulum masses 26 ranges between 9 and 15 mm.

In the example under consideration, pendulum-type damper 2 is offset axially from supplementary damper 3 and from limiter 4. Furthermore, this pendulum-type damper 2 is outside the path taken by the torque. In fact, the torque would always be transmitted by device 1 if pendulum-type damper 2 were not present.

In the example under consideration, supplementary damper 3 is disposed, in the sense of torque transmission, between limiter 4 and the pendulum-type damper 2.

In the example under consideration, pendulum masses 26 and coatings 5 are offset axially, and they overlap at least partly when device 1 is viewed along axis X.

Figure 2:
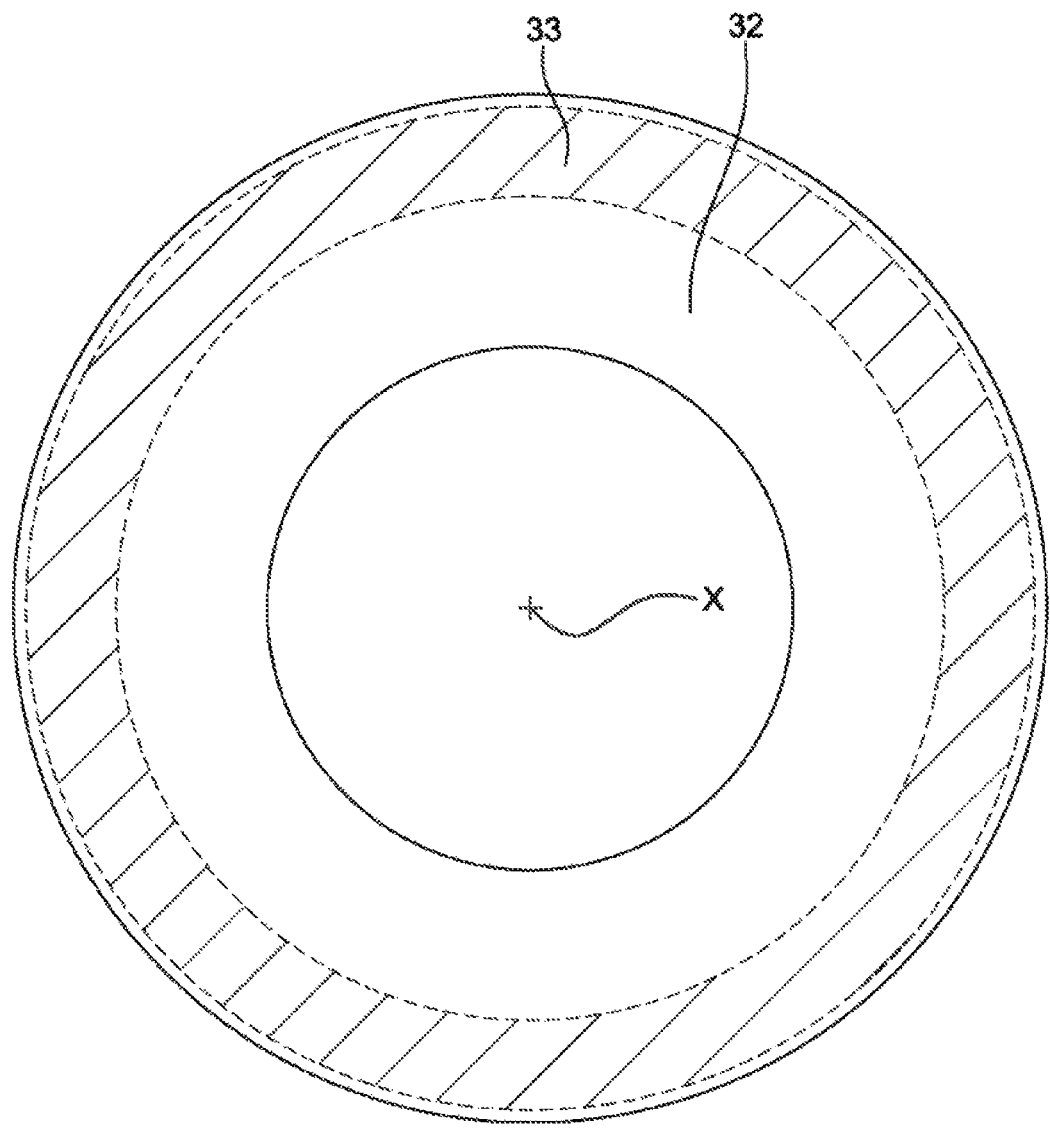
FIG. 2 represents zones of movement of a friction coating and of a pendulum mass.

This overlap can be seen in FIG. 2, which represents zones of movement of coatings 5 and of pendulum masses 26 respectively.

The zones of movement of pendulum masses 26 or of coatings 5 are all of the positions occupied by these pendulum masses and these coatings.

The pendulum masses 26 all describe the same movement zone 32, which movement zone is superposed axially and partly on movement zone 33 described by coatings 5. In certain configurations of device 1, at least one axis exists that is parallel to axis X and passes through both a coating 5 and a pendulum mass 26.

In the example under consideration, and with reference to FIG. 1, when measured along an axis parallel to axis X and passing through both a pendulum mass 26 and a coating 5, axial thickness 36 of pendulum-type damper 2 on the one hand and axial thickness 35 of the assembly formed by coatings 5 and disk 6 of the limiter on the other hand satisfy a ratio of between 3 and 8, preferably of between 5 and 7.5.

The invention is not limited to the examples that have just been described.

The invention claimed is:

1. A device for damping torsional oscillations in torque transmission, comprising:
    a pendulum-type torsional oscillation damper;
    a supplementary torsional oscillation damper, including an input element, an output element, wherein both are configured to rotate around one axis of rotation, and at least one mechanical energy accumulator device disposed between the input and output elements, wherein the pendulum-type damper is disposed downstream from the supplementary damper in a direction of the torque transmission, and the supplementary damper is disposed between a torque limiter and the pendulum type damper in the direction of the torque transmission; and the torque limiter, including at least one friction coating fixed on a disk, configured to be displaced around the axis, wherein the disk is connected to rotate with the input element of the supplementary torsional oscillation damper, wherein the at least one friction coating is fixed to the disk of the torque limiter by a surface-to-surface joint.

2. A device according to claim 1, wherein the surface-to-surface joint extends in a plane.

3. A device according to claim 1, wherein the coating is overmolded onto the disk of the limiter to form an adhesively bonded surface-to-surface joint.

4. A device according to claim 1, wherein the coating is glued onto the disk of the limiter to form an adhesively bonded surface-to-surface joint.

5. A device according to claim 1, wherein the coating is welded onto the disk of the limiter to form an adhesively bonded surface-to-surface joint.

6. A device according to claim 1, wherein axial thickness of the coating is less than 1 mm.

7. A device according to claim 1, wherein axial thickness of the assembly formed by the coating or coatings and the disk of the limiter is less than 3 mm.

8. A device according to claim 1, further comprising an output hub, configured to rotate around the axis and integral with each of the torsional oscillation dampers.

9. A device according to claim 1, wherein the supplementary damper includes an auxiliary annular skirt and two guide washers mounted on both sides of the auxiliary skirt, wherein the input element of the supplementary damper is formed by the guide washers and the output element is formed by the auxiliary skirt.

10. A device according to claim 1, wherein the pendulum-type damper includes a pendulum support configured to rotate around the axis and with at least one pendulum mass, configured to be displaced freely and to be guided by the pendulum support.

11. A device according to claim 10, wherein, when the device is viewed along the axis, the pendulum mass describes a zone of movement that is superposed at least partly on the zone of movement described by the coating.

12. A device according to claim 11, wherein, when measured along an axis parallel to the axis and passing through the pendulum mass and the coating, axial thickness of the pendulum-type damper and axial thickness of the assembly formed by the coatings and the disk of the limiter satisfy a ratio of between 3 and 8.

13. A motor vehicle transmission train comprising a device for damping torsional oscillations in torque transmission through the transmission train, the device for damping torsional oscillations comprising:

a pendulum-type torsional oscillation damper;

a supplementary torsional oscillation damper, including an input element, an output element, wherein both are configured to rotate around one axis of rotation, and at least one mechanical energy accumulator device disposed between the input and output elements, wherein the pendulum-type damper is disposed downstream from the supplementary damper in a direction of the torque transmission, and the supplementary damper is disposed between a torque limiter and the pendulum type damper in the direction of the torque transmission; and the torque limiter, including at least one friction coating fixed on a disk, configured to be displaced around the axis, wherein the disk is connected to rotate with the input element of the supplementary torsional oscillation damper, wherein the at least one friction coating is fixed to the disk of the torque limiter by a surface-to-surface joint.

14. The device according to claim 13, further comprising an output hub configured to rotate around the axis of rotation and integral with each of the torsional oscillation dampers, wherein the pendulum-type damper includes a pendulum support configured to rotate around the axis of rotation and with at least one pendulum mass, configured to be displaced freely and to be guided by the pendulum support, whereby the pendulum-type damper is centered on and integral with the output hub.

15. The device according to claim 13, further comprising an engine flywheel of a torque input element connected to rotate with two drive disks which are concentric with the axis of rotation and belong to the torque limiter, wherein in the event that excessive torque is applied to the torque limiter, the at least one friction coating is able to slide relative to the drive disks, and wherein an elastic device is interposed between one of the two drive disks and a drive plate.

* * * * *